United States Patent Office 3,066,055
Patented Nov. 27, 1962

3,066,055
PROCESS AND COMPOSITION FOR PRODUCING ALUMINUM SURFACE CONVERSION COATINGS
George H. Pimbley, Inglewood, Calif., assignor, by mesne assignments, to Purex Corporation, Ltd., a corporation of California
No Drawing. Filed Nov. 10, 1958, Ser. No. 772,677
23 Claims. (Cl. 148—6.27)

This application is a continuation-in-part of my copending applications Serial No. 550,825, filed December 5, 1955, now Patent No. 2,868,679 Serial No. 647,933, filed March 25, 1957, now Patent No. 2,898,250 and Serial No. 710,402, filed January 22, 1958, now Patent No. 2,948,643.

In the prior art many methods are known of producing chemical films on aluminum surfaces, some of which have been commercially advantageous and have been widely practiced for many years past. Among these are the formation of artificial oxide coatings by means of electric current in chemical baths, the immersion of clean aluminum surfaces in alkaline baths containing chromate compounds whereby oxide type coatings are produced, the formation of phosphate coatings employing a phosphate ion as an essential element, e.g., in the form of an acid phosphate, and immersion in acidic baths containing an acid material other than the phosphate ion, together with other components, which baths attack aluminum and are effective to form a fixed integral film upon the surface of the aluminum object. It is the last-mentioned class of compositions to which the present invention belongs. A brief description of this category of chemical coatings on aluminum is given below.

It has been known in the prior art that when an object having a surface of aluminum, or of any alloy in which aluminum predominates, is cleaned free of grease and other surface soil, and then immersed in or otherwise contacted with a solution containing anions of an acid which attacks aluminum, such as hydrofluoric acid, together with dichromate and hydrogen ions, a chemical reaction occurs which results in a fixed, integral film upon the aluminum surface. The precise nature of this reaction, and of the resulting film is not known. Probably some of the aluminum is dissolved, bringing about an increase of pH at the interface between the aluminum surface and bath liquid, and formation of chromium and aluminum fluorides, oxides and hydroxides. The coating that results is probably a gel-like complex, containing some or all of these substances in an unknown state of chemical combination and physical structure. Generally, these coatings are thin, smooth, non-crystalline, relatively adherent and flexible, moderately lustrous, and of light yellow color with more or less red and greenish iridescence. The exact shade of color and degree of lustre differ greatly, according to which alloy of aluminum is being processed and according to the details of the processing procedure. Such coatings are known as conversion coatings.

Such chemical conversion coatings have been found sufficiently advantageous to warrant increasing use by airplane manufacturers and other industrial fabricators of aluminum. The procedures for application of such coatings have certain attractive features, including simplicity, low processing temperatures, brief contact time and feasibility of spray application.

However, the coatings and procedures of the prior art possess serious faults, which the present invention seeks to avoid. Among these faults is that of insufficient corrosion resistance to meet present day exacting requirements of military aircraft intended to be flown over salt-laden ocean atmospheres. Another is lack of adherence of the coating immediately after work pieces are lifted from processing tanks, fresh coatings having been subject to streaking and smearing when the coated object is handled shortly after processing. This is inconvenient under heavy shop production schedules, and is a prevalent cause of defective work, rejects, and low production rate. Another drawback of the prior art has been that when the processing has been so adjusted as to temperatures, concentrations, and contact time as to produce deep solid coloring, desirable for ornamentation, the coatings have been lacking in requisite degree of corrosion resistance. Attainment of desirable color has been attended with tendency to early pitting and excessive corrosion under service conditions. Other defects have been difficulty of process control, erratic performance, early exhaustion of processing baths, and excessive variation of color, general appearance and character of performance between various alloys of aluminum.

My above-noted copending application Serial No. 550,825 discloses compositions and baths for producing improved colored conversion coatings on aluminum and its alloys, containing compounds furnishing one or more than one of the beryllium, magnesium, calcium, strontium, barium or lithium cations.

My above-mentioned copending application Serial No. 710,402 discloses compositions and baths for obtaining improved colored and colorless conversion coatings on aluminum and its alloys, containing compounds furnishing zinc, cadmium or mercury cations.

In many instances it is also desirable to produce a colorless or almost colorless conversion coating without impairing the other properties of the coating, for example, its corrosion resistance, smear-proofness and uniformity. It is known in the art to treat a conversion coating formed on aluminum, with hot water to remove or leach out of the film the yellow coloration in the coating following treatment in the conversion coating bath. While this hot water treatment reduces to some degree the color of the film or coating, the latter still retains more or less iridescence mostly in the nature of red, green and blue coloration, and the operation is inconvenient and time-consuming.

Further, where the coating is quite firmly fixed, such removal of the yellow color in the above noted manner is often difficult to achieve, particularly with certain aluminum alloys. Moreover, to obtain a coating of maximum corrosion resistance, it is necessary to prolong the time of treatment in the conversion coating bath to obtain a thicker coating, and the thicker the coating, the more difficult it is to remove the yellow coloration by the above noted treatment with hot water.

My above-mentioned copending application Serial No. 647,933, discloses compositions and baths for obtaining improved colorless conversion coatings on aluminum and its alloys, by use of certain types of carbon-nitrogen compounds such as thiourea and thiocyanates.

One object of the present invention is to increase the resistance of aluminum and aluminum alloy surfaces to corrosion, even under adverse conditions such as exposure to salt laden sea air, chemical fumes and solutions, and the like.

Another object is to provide aluminum and aluminum alloy surfaces with improved resistant coatings which are unusually flexible and adherent under conditions of stress.

A further object is to provide coatings for aluminum and its alloys which are effective to greatly improve the bonding of paints and other organics to the aluminum surfaces.

Yet another object is to provide means of ornamentation or an ornamental coating for aluminum and aluminum alloy surfaces.

A still further object of the invention is to produce colored or substantially colorless coatings or films on aluminum surfaces.

Another object is the provision of colored or substantially colorless aluminum conversion coatings having good corrosion resistance.

Yet another object is to produce such colored or substantially colorless aluminum conversion coatings, employing the same composition for both purposes, but simply varying the conditions of treatment to obtain either the colored or the colorless coating, as desired.

A still further object of the invention is to provide unique versatile compositions, and a simple, highly effective process, to accomplish the above objects.

I have now discovered that by employing compositions furnishing cations selected from the group of elements 23 to 29 inclusive, of the periodic table, namely, vanadium, chromium, manganese, iron, cobalt, nickel or copper, I can remedy the faults and shortcomings of previously known acidic type conversion coatings for aluminum, and I can obtain aluminum conversion coatings characterized by possessing improved corrosion resistance, being more quickly formed and fixed, and having improved resistance to smearing and improved brilliance and uniformity of color. The elements 23 to 29 are preferably employed in their most stable valence state. For example, nickel and cobalt are preferably utilized in their divalent form, iron in its trivalent form, copper and manganese in their divalent forms and chromium in the trivalent state. These cations can be used singly or as mixtures of two or more thereof.

I have further discovered that simply by changing the pH of the solution formed by employing the novel compositions of the present invention containing the above noted elements or cations selected from the group consisting of elements 23 to 29, I can obtain either strong, bright yellow conversion films on an aluminum object, or bright, substantially colorless films, without sacrifice of any of the aforementioned other advantageous properties of the conversion coating. Hence, the invention provides a single versatile composition eminently suited for production of improved colored or colorless conversion coatings, depending upon the manipulation of the treating bath.

With respect to all of the above noted characteristics and advantages and including paint and organic coat bonding properties, the coatings produced with baths containing cations derived from the above mentioned elements 23 to 29 inclusive are all much superior to those from prior art baths containing only sodium, potassium or ammonium as cations, and in the absence of any of the above group of elements 23 to 29 of the invention. Further, the coatings made with baths containing cations selected from the above group of elements 23 to 29 are much more uniform from piece to piece, and from one alloy to another than in the prior art.

With regard to the improvement of aluminum conversion coatings by introduction of my novel cations, the mechanism of the action of such cations is presently not known. I have discovered, however, that while marked improvements of the coatings may be obtained by employment of the novel cations described in my copending application Serial No. 550,825 and in my copending application Serial No. 710,402, the quality of the coatings may be even more enhanced by employment of the cations of the present invention herein described, namely those derived from elements 23 to 29, inclusive, of the periodic table. The nature of the improvement is that the conversion coatings become much more firmly fixed against smearing and rubbing, the appearance is enhanced with respect to uniformity, brilliance of color, lustre and iridescence, and the corrosion resistance is increased.

With regard to comparison between the individual elements within the group of elements 23 to 29, inclusive, I have found that the best results are obtained with nickel or cobalt as the cation and that these two metals as cations are about equally effective regarding attainment of all of the above noted results. Nearly as good results are obtained employing manganese, iron or copper cations. Cations of the metals vanadium and chromium, while satisfactory and adequate, are, however, less preferable. It has been observed, however, that while trivalent chromium produces conversion coatings having corrosion resistance about equal to that employing manganese, copper or iron cations, it is less satisfactory in that it tends to form a purple blotchy coloration in the generally yellow colored coating. Vanadium has somewhat of a disadvantage in producing a weak coloration but has the advantage of producing a green coloration if such is desirable. Vanadium cation also tends towards lower corrosion resistance than the other cations of the group 23 to 29 elements. It has been observed that the yellow colored conversion coatings employing nickel, cobalt, manganese, iron or copper as cations are at least equal to and in some instances superior to the conversion coatings formed employing the group II-A cations of my above application Serial No. 550,825, or the group II-B cations of my copending application Serial No. 710,402. As to formation of the colorless type conversion coatings, cations derived from nickel, cobalt, manganese, iron or copper also produce superior conversion coatings over those of the prior art and at least comparable to those produced employing the carbon-nitrogen compounds described in my above application Serial No. 647,933. In the cases of both the colored and colorless conversion coatings, cations derived from nickel, cobalt, manganese, iron or copper produce coatings having markedly superior corrosion resistance, in some instances withstanding salt spray tests for periods of time ranging from 500 to 1000 hours. The cations derived from vanadium and chromium produce acceptable yellow and colorless conversion coatings having a substantial measure of corrosion resistance, but the performance of this latter group is less satisfactory than that of nickel, cobalt, manganese, iron or copper cations.

The solutions of the invention preferably also should contain an anion containing hexavalent chromium. Such anion appears to function in conjunction with the above mentioned cations derived from the group 23 to 29 elements, as well as with the other ions in the solution, to confer greater corrosion resistance on the resulting coating, and also is believed to cause the yellow color of the coating at a certain pH of the treating solution as described more fully hereinafter. When anions containing hexavalent chromium are present in the solution, the source material for said chromium may be a material such as chromium trioxide or a chromate or dichromate such as the sodium or potassium chromate or dichromate.

However, the hexavalent chromium-containing anion may be partially or wholly replaced by a molybdenum or tungsten-containing anion, e.g., the molybdate or tungstate anion, although ordinarily I prefer the hexavalent chromium type. I have also found that the hexavalent chromium-containing anion may be replaced, wholly or in part, by ferricyanide anion. In certain instances it is advantageous to employ the ferricyanide anion in place of hexavalent chromium-containing anion, particularly when a pronounced green tone is desired to be imparted to a yellow conversion coating. The ferricyanide ion may be introduced, for example, by employing ferricyanides of ammonium, potassium or sodium. The molybdenum and tungsten-containing anions and ferricyanide anions will be termed equivalent anions of the hexavalent chromium-containing anion, although it is to be understood that the ferricyanide anion has unique advantageous properties of the nature above mentioned. These anions may be employed singly or in combination.

Preferably the treating solutions of the invention also contain an anion which effectively attacks or corrodes aluminum such as halogen-containing anions, i.e., an anion containing fluorine, chlorine, bromine or iodine. The simple halogen anions can be employed or complex anions containing a halogen. The complex halogen-containing anions which are suitable are those forming free halogen ions in equilibrium with the complex anion under the acid conditions employed herein, so that the solution contains some free halogen ion together with such complex anion. The preferred anion is the fluorine-containing ion either as a simple fluorine anion or in the form of a complex, as this type is the most effective and convenient. The anions of chlorine, bromine and iodine are also effective and useful for the attack on the aluminum surface, but in a lesser degree and by the use of higher processing temperatures and longer periods of contact. The latter anions are usually employed as the simple chlorine, bromine or iodine anions.

In the preferred practice of my invention an aqueous solution is first prepared containing in suitable proportions the cations derived from the above-mentioned group 23 to 29 elements and the hexavalent chromium anion or equivalent anion, together with hydrogen ions and suitable proportions of halogen-containing, e.g., fluorine-containing anion. The processing solution thus prepared is contacted with the clean aluminum surfaces by usual methods of application, such as spraying, immersion, brushing, swabbing, etc., under suitable conditions of temperature and length of time of contact to produce the desired improved surface conversion coating.

It is difficult as a practical matter to define a suitable processing solution in terms of concentrations of each of the ions contained therein for producing either colored or colorless conversion coatings, since the exact degree of ionization for each compound under all of the varying conditions cannot be precisely ascertained. I have found, however, that for providing satisfactory processing solutions according to the invention, the amount in grams per liter of the group of cations derived from elements 23 to 29 inclusive, and the amount of hexavalent chromium, molybdenum or tungsten present in the anion and the amount of the ferricyanide anion, and the amount of the halogen, preferably fluorine, in the aluminum attacking halogen-containing anion should be within certain ranges or proportions of concentration set forth below for producing best results. Further, especially successful operating solutions can be produced if the ratio of the weight of the fluorine or other halogen in the aluminum attacking anion employed to the weight of the preferred hexavalent chromium, molybdenum, tungsten or ferricyanide in the corresponding anion employed falls within a certain range as noted below. The proportions of cations of the elements 23 to 29 present in the bath in relation to the amounts of preferred hexavalent chromium, molybdenum or tungsten or ferricyanide of the equivalent anions, and in relation to the amount of halogen in the halogen-containing ion, e.g., fluorine-containing ion, present is of minor importance as long as there is present a substantial proportion of such cations and as long as the amount is not highly excessive.

The cations of the invention, derived from the elements 23 to 29 inclusive, may be introduced by means of commonly available commercial products, such as the oxides, hydroxides, halides and nitrates of vanadium chromium, manganese, iron, cobalt, nickel and copper. In cases of some of the more difficultly soluble of these compounds, it is convenient to facilitate solution by simultaneous addition to the bath of a suitable amount of nitric acid. There are many possible combinations of commonly available commercial products, such as those noted above, that may be employed successfully for preparation of baths in the practice of the invention with the aforementioned cations and anions preferably present in the proportions set forth below.

Generally I have found that the amount of the elements or cations 23 to 29 employed should be equivalent to about 0.2 to about 8.0 grams of the element per liter of processing solution, depending upon the particular element employed.

Considerable latitude is provided as to the range of concentration of hexavalent chromium compound employed. I have found that a suitable working concentration of hexavalent chromium, molybdenum or tungsten-containing anion or ferricyanide anion for the purpose of the invention is produced by employing an amount of such material equivalent to between about 0.3 and about 9.0 grams of the element chromium, molybdenum or tungsten, or of the ferricyanide ion per liter of processing solution.

Concerning the amounts of source material for the aluminum attacking, e.g., simple or complex fluorine-containing ions preferably used along with the hexavalent chromium-containing or equivalent anion in the bath, the amounts of such material may also be varied to produce the desired results. However, here consideration should be given to the ratio of the amounts of combined aluminum attacking material such as fluorine and of combined hexavalent chromium-containing or equivalent anion material. It is believed that the operation of the process of the invention involves release of aluminum attacking, e.g., fluorine-containing, ions which serve to attack the aluminum surface as a part of the coating action. It is thus necessary to have present enough source material to supply an adequate proportion of such ions. On the other hand, a proportion of aluminum attacking, e.g., fluorine-containing substances greatly in excess of that required for proper coating action will cause excessive attack on the aluminum and impair the anti-corrosion value of the coating. In view of lack of exact knowledge of the chemical reactions that occur in the coating process, the amount of compound containing the aluminum attacking anion, preferably fluorine-containing compound, to be introduced into every type of processing solution that may be successfully used in the practice of this invention cannot be precisely fixed as a practical matter because of the wide variations in conditions thus encountered. However, I have experienced highly satisfactory results with solutions in which the weight ratio of hexavalent chromium, molybdenum or tungsten present in their respective anions, or of ferricyanide anion: fluorine present in the fluorine-containing anion has a range between about 0.7:1 and about 2.5:1.

The immediately foregoing range of ratios permits use of a variety of source materials for fluorine-containing ions. Many fluorine compounds can be successfully used as the source of said ions, including HF, NaF, $NH_4HF_2$, $HBF_4$, $NaBF_4$, $NH_4BF_4$, $ZnSiF_6$ and $Na_2SiF_6$. These compounds vary in ionization characteristics, and hence, they are used in varying proportions, depending upon the particular compound selected. The complex ions, e.g., the $BF_4$ and $SiF_6$ ions produced by the corresponding compounds are believed to dissociate to form free fluorine anions and hence such free fluorine anions are present and in equilibrium with the complex anions. I have found that the simple fluorides, such as NaF, should be present in such proportion that the ratio of hexavalent chromium, molybdenum, tungsten or ferricyanide of their respective anions: fluorine approaches the 2.5 end of the above range. The more complex fluorine compounds, such as $NaBF_4$, may be satisfactorily used in larger quantities, so that the aforementioned ratio approaches the 0.7 limit of the above range.

I may also employ as the source of fluorine-containing ion the following double metal fluorides: potassium titanium fluoride, sodium titanium fluoride, potassium zirconium fluoride, ammonium beryllium fluoride, ammonium cadmium fluoride, ammonium aluminum fluoride, ammonium chromium fluoride, potassium molybdenum fluoride, potassium rhenium fluoride, ammonium zirconium fluoride, potassium zirconium pentafluoride, sodium zirconium pentafluoride, potassium ferric fluoride, potasium zinc fluoride, ammonium titanium fluoride, potasium hafnium fluoride, potassium columbium fluoride, and potassium tantalum fluoride. Here, also, these complex double metal fluorides are believed to dissociate to form free fluorine ions in equilibrium with the complex metal cations.

When it is desired to employ aluminum-attacking substances other than those containing fluorine, the same general considerations obtain as to the proportions between such substances and the hexavalent chromium-containing or equivalent anions. Thus, for example, when chlorine-containing substances are used, the range of the weight ratio Cr(VI):Cl may be about the same as for fluorine, i.e., about 0.7:1 to about 2.5:1. Because of the higher atomic weights of bromine and iodine, and the more sluggish action in processing baths of this invention, as compared with fluorine, it is feasible to use larger amounts of Br and I, so that, for example, the value of the weight ratio Cr(VI):Br or I will be smaller. Thus, a suitable range for Cr(VI):Br is about 0.5:1 to about 1.7:1, and a suitable range for Cr(VI):I is about 0.3:1 to about 1.4:1.

It is to be understood that the proportions and ranges given above are not critical and that results nearly as satisfactory may be obtained outside these limits, but they are the proportions and ranges I prefer.

I have found that a satisfactory processing solution for practice of the present invention should most desirably possess a concentration of hydrogen ions such that the pH of the solution falls within the overall range of about 1.6 to about 3.5, with the colored conversion coatings being obtained in the lower portions of this pH range, and the substantially colorless conversion coatings obtained in the higher portion of such pH range. Thus, when it is desired to produce a colored, e.g., a yellow conversion coating the pH of the solution preferably should be maintained between about 1.6 and about 2.2, and for the production of colorless conversion coatings, the pH preferably should be maintained in the range of about 2.5 to about 3.5. At the intermediate pH of 2.3 to 2.4, some coating coloration which may vary from deep to pale shades as the pH approaches 2.5, is obtained. Various acidic materials such as nitric acid, sulphuric acid, boric acid and acid salts can be employed provided the particular acidic material utilized does not produce excessive attack on the aluminum nor excessive insoluble material or sludge in the processing solution. However, acidic materials which form a surface film by combination of the aluminum with such acidic materials, e.g., phosphoric acid or acid salts thereof, are not suitable, and are intended to be excluded from my compositions.

The chemicals for makeup of the bath may be introduced in any convenient form such as powders or liquid solutions, separately, or as compounded products. Usually it is most convenient to employ the dry materials as a compounded, powder product, and to introduce the nitric acid, or other liquids separately. Hence, the above described novel compositions in the form of mixtures in dry powdered form, as well as the solutions prepared therewith, are features of this invention.

The dry mixtures of the invention including a compound containing a cation selected from elements 23 to 29 inclusive, together with a compound containing hexavalent chromium, for production of a chromium-containing anion, or a compound producing an equivalent anion as defined above, and a compound containing a material producing an aluminum attacking anion, preferably the fluorine-containing anion, should preferably contain a weight of compound equivalent to from about 5.0 to about 45.0% calculated as one or more elements selected from elements 23 to 29 inclusive, by weight of the composition, and a weight of compound equivalent to about 5.0 to about 50.0% by weight calculated as hexavalent chromium, or as molybdenum, tungsten or ferricyanide in the equivalent anion-producing substances. The halogen-containing, e.g., fluorine-containing, compound should be present in an amount such that the composition shall contain an amount of compound equivalent to about 2.0 to about 40.0% by weight calculated as the simple halogen, e.g., fluorine. When the cation selected from elements 23 and 29 inclusive, the hexavalent chromium or equivalent material, and the halogen-producing material are present in the dry mixture in the aforementioned range of proportions, on addition of such dry mixture to water in an amount of about 1.0 to 3.0 ounces per gallon for producing the processing solution, there will be formed in the solution one or more of the cations containing elements 23 to 29, the hexavalent chromium-containing or equivalent anion generally within the range of amounts previously noted as being the preferred concentrations of these materials, and a ratio of hexavalent chromium or equivalent material to fluorine in the aforementioned ranges. Where the acidic material can be solid such as boric acid powder or certain acid salts, such as sodium bisulphate, these materials may be also incorporated in the dry mixture containing compounds including the elements 23 to 29, and hexavalent chromium or equivalent anion producing material in a proportion of 3.0 to about 15% of the acidic material by weight of the composition, so as to produce a pH within the desired portion of the overall pH range of the processing solution noted above. Again, it is to be understood that while the above ranges are preferred, satisfactory results may also be obtained outside these ranges.

A stainless steel vessel should be used for the bath, or some equally resistant vessel that will neither be attacked by the bath, nor have any contaminating effect on the bath. The ingredients for the bath are first mixed cold and the pH of the solution is then ascertained. If outside of the best operating pH range of about 1.6 to about 3.5, the pH can be brought within that range by addition of a suitable acid, such as nitric, if the pH is too high, or by a suitable alkaline substance such as ammonium hydroxide if the pH is too low.

The aluminum surfaces to be treated in the solutions of the invention should be free from grease and other surface soils. A mild alkaline cleaning bath, e.g., one containing alkali metal carbonates, safe for aluminum, at a concentration of 6 to 8 oz. per gallon, is recommended for this purpose, at 170°–180° F.

End results frequently will be improved if surface oxide coating is removed, after alkaline cleaning, by pretreatment in a suitable acid type deoxidizing agent, e.g., mixtures of sulfuric, chromic and hydrofluoric acids. The work should be thoroughly rinsed after each pre-cleaning and deoxidizing operation prior to treatment in the solution of the invention.

The clean aluminum surfaces may be treated by dipping the objects into the processing solutions hereof. Operating temperature ranges of about 75°–95° F. and immersion time preferably of about 3–8 minutes are recommended. These conditions should be regulated according to the nature of the coating being produced. Thin, bright, uniform coatings are best for corrosion resistance and paint adhesion. If the coating is dull, powdery or chalky, then the temperature or contact time, or both, should be diminished.

After its removal from the conversion coating bath, the work is rinsed in water. Where a colored coating is desired, the coating will be of stronger color if the work is allowed to remain suspended in the air for 30 to 60 seconds before rinsing.

The final step is the dry-off, which may be accomplished by the usual methods, e.g., treatment of the coated objects in a dry-off oven.

The above recommendations pertain to dipping application. However, the same baths prepared as above, may also be used for spraying, with the same kind of surface preparation of the aluminum object. For spraying, the solution temperature should be about 90°–100° F., and the time of spray contact should be about 1–3 minutes. The same bath may also be used for brushing and swabbing applications. If desired, it may be thickened for this type of application by means of Bentonite clay, so that the solution will not run off vertical surfaces.

As a means of routine control, a sample of the bath is withdrawn from time to time during operation, and for example, the hexavalent chromium content ascertained, expressed as grams per liter of Cr(VI), by usual methods of analysis. It will be found that the Cr(VI) content diminishes as the operation proceeds on a long succession of work pieces, and this periodical determination of Cr(VI) content serves as a convenient criterion as to need for replenishment of the bath. I have found that the various substances in the processing baths used in practice of this invention are ordinarily consumed in about equal proportions. Therefore, a replenishment that will restore the hexavalent chromium to its original content, serves as a criterion as to the amount of replenishment required for the other constituents of the bath, they being added in the proportions relative to each other employed in constituting the original bath. The depleted Cr(VI) is simply restored and then other materials are added in corresponding amounts to replenish these other components. This procedure is most convenient if the dry chemicals have all been added as one mixed product, since an addition of the mixed product sufficient to restore the depleted Cr(VI) will automatically replenish all other constituents in corresponding degree. Acid should be added also, if required, so as to maintain the pH within the above noted range.

I have found that baths operated in accordance with this invention are free from objectionable deposits of solid sludge on the work, or on bottom of the tanks. The operation proceeds smoothly, with little or no waste of chemicals, throughout application to a large number of work pieces in succession.

If desired, where the invention process results in a yellow conversion coating, such residual coloration can be removed for production of colorless coatings by the after treatment procedure using the agents described in my above application Serial No. 647,933 or I may treat aluminum or aluminum alloy objects bearing the yellow conversion coatings with a dilute solution of potassium ferricyanide or chromic nitrate, or of the color discharge agents described in my copending application, Serial No. 754,935, filed August 14, 1958, now Patent No. 2,927,874 followed by a rinsing in cold water.

The following test illustrates particularly the improved corrosion resistance obtained employing the group 23 to 29 cations of the invention as compared to the sodium and potassium cations of prior art conversion coating compositions. Typical prior art baths containing nitric acid, hexavalent chromium-containing anion as dichromate, fluoborate ions, and sodium or potassium cations were employed for applying a conversion coating on 24-S aluminum alloy panels, and results employing the same alloy in similar baths under the same conditions but substituting the group 23 to 29 elements in place of the sodium or potassium cations compared therewith. The corrosion effect on each panel was then expressed as estimated percent of area remaining intact in each case after being subjected to the same standard salt spray exposure test for 168 hours. The percentage remaining intact is intended to denote that portion of the total coated area which is visibly unaffected by the salt spray mist, the remaining area of conversion coating being visibly affected in an adverse manner, e.g., discolored, and/or corroded.

The conversion coatings on the panels treated in the solutions containing sodium or potassium cation had only about 60% of surface intact after the 168 hours of salt spray test, whereas the conversion coatings obtained employing each of the respective 23 to 29 cations of the invention have at least 90% of the surface intact, and in many instances, e.g., particularly when employing nickel, cobalt, manganese, iron or copper cations, 95 to 100% of the coated surface remains intact.

The following are examples of practice of the invention: Corrosion resistance of the conversion coatings in the various examples below was determined according to the salt spray exposure test described in Federal Specification QQ-M-151.

Example 1

A solfution was prepared by dissolving in water the following ingredients in the amounts indicated, per liter of solution:

| Ingredients: | Grams |
|---|---|
| Nickel nitrate, $Ni(NO_3)_2 \cdot 6H_2O$ | 8.0 |
| Chromium trioxide, $CrO_3$ | 1.4 |
| Hydrogen fluoride, HF (This item was introduced as a dilute aqueous solfution.) | 0.4 |

Panels of 3003 aluminum alloy were treated in the above bath for 6 minutes at temperature of 82 degrees F. and pH of 2.0. An excellent yellow conversion coating was formed, which was bright, strong, and with red and green iridescence. The film was fast against smearing when wet and did not rub off when dry. General appearance was uniform and very pleasing. Salt spray test showed high corrosion resistance on exposure for 984 hours, about 90% of the coated surface area estimated as remaining intact.

Example 2

A dry mixture was prepared, having the following ingredients in the proportions indicated. The mixture was in powder form, free flowing, and was suitable for packaging and shipping.

| Ingredients: | Percent by weight |
|---|---|
| Nickel fluoride, $NiF_2 \cdot 4H_2O$ | 59.0 |
| Chromium trioxide, $CrO_3$, powdered | 29.5 |
| Boric acid, $H_3BO_3$, powdered | 11.5 |
| | 100.0 |

A processing solution was prepared by dissolving the above mixture in water at concentration of 2¼ ounces per gallon water. Sufficient nitric acid (Sp. Gr. 1.42) was added to the solution to bring it to pH 3.0, about 2.5 grams nitric acid per liter being used. A clear yellow solution resulted.

Panels of 2024 aluminum alloy sheet were treated in the above solution for 6 minutes at temperature of 82° F. and pH 3.0. A colorless conversion film was produced which was bright and had a faint red iridescence, barely visible. There was no tendency to smear or rub off. The coating had excellent corrosion resistance, as tested by salt spray exposure for period of 336 hours.

The above processing solution was then adjusted to pH 2.1 by addition of a small amount of nitric acid. Additional panels of 2024 aluminum alloy were treated in the bath and acquired an excellent conversion coating in 6 minutes immersion time at temperature 82° F. The conversion coatings were now of bright pale yellow-green color, with iridescence and being very uniform and pleasing in appearance, with no tendency to smear or rub off. Corrosion resistance was found to be excellent upon salt spray exposure of 744 hours, about 90% of the coated surface area estimated as remaining intact.

Example 3

A dry mixture was prepared, having the following ingredients in the proportions indicated. The mixture was in powder form, free flowing, and was suitable for packaging and shipping.

| Ingredients: | Percent by weight |
|---|---|
| Basic nickel carbonate | 33.3 |
| Potassium dichromate, $K_2Cr_2O_7$ | 41.7 |
| Sodium fluoride, NaF | 25.0 |
| | 100.0 |

A processing solution was prepared by dissolving the above composition in water at concentration of 1½ ounces per gallon water, about 8 grams of nitric acid (Sp. Gr. 1.42) per gallon of solution being added to facilitate solution of the solids and to bring the bath to a working pH of 2.5.

Panels of 2024 aluminum alloy were treated in the above solution for 4 minutes at 85° F., acquiring a colorless conversion coating which was bright, uniform and with no smearing or rub-off defects. The coating had excellent corrosion resistance, as tested by salt spray exposure for period of 336 hours.

The above processing solution was then adjusted to pH 1.8 by addition of a small amount of nitric acid. Panels of 2024 alloy aluminum were treated for 7 minutes immersion time, at temperature of 85° F. Conversion coatings were produced on the surfaces which were medium yellow in color, bright and iridescent, uniform and free from blotches. There was no tendency for the films to smear when wet or to rub off when dry. Corrosion resistance was excellent, as judged by very good performance in the above noted salt spray test for period of 720 hours, about 90% of the coated surface area estimated as remaining intact.

*Example 4*

A processing solution was prepared by dissolving in water the following ingredients, in the proportions indicated, per liter of solution:

Ingredients: Grams
Cobaltous nitrate, $Co(NO_3)_2 \cdot 6H_2O$ _____ 8.0
Chromium trioxide, $CrO_3$ _____ 1.4
Hydrogen fluoride, HF (This item was introduced as a dilute aqueous solution.) _____ 0.4

The bath as prepared above was a clear yellow solution and had a pH of 1.9 without any adjustment. Panels of 2024 aluminum alloy were treated in this bath by immersion for 6 minutes at temperature 80° F. The surfaces acquired conversion coatings that were of strong greenish yellow color, bright, uniform and of very pleasing appearance generally. There was but little iridescence, and no smearing or rub-off. Corrosion resistance was excellent, as tested by salt spray exposure for 840 hours, about 90% of the coated surface area estimated as remaining intact.

*Example 5*

A processing solution was prepared by dissolving in water the following ingredients, in the amounts indicated, in grams per liter of solution:

Ingredients: Grams
Ferric nitrate, $Fe(NO_3)_3 \cdot 9H_2O$ (Introduced as a commercial 75% solution) _____ 24.0
Sodium fluoride, NaF _____ 1.0
Chromium trioxide, $CrO_3$ _____ 1.4
Hydrogen fluoride, HF _____ 0.4
Ammonium hydroxide, sp. gr. 0.897 _____ 1.4

The above solution had pH of 2.2. Panels of 2024 aluminum alloy immersed therein for 7 minutes at temperature 82° F., acquired conversion coatings of bright, light greenish yellow color, and were uniform, and free from the defects of smearing or rub-off. Resistance to corrosion in the above salt spray test was good, as determined by exposure for 336 hours, about 90% of the coated surface area estimated as remaining intact, indicating good corrosion resistance.

*Example 6*

A solution was prepared by dissolving in water the following ingredients, in the amounts indicated in grams per liter of solution:

Ingredients: Grams
Manganese carbonate, $MnCO_3$ _____ 4.3
Nitric acid, sp. gr. 1.42 _____ 5.6
Water _____ 100.0

The above ingredients were stirred until all solid was in solution. Then was added the following:

Grams
Chromium trioxide, $CrO_3$ _____ 1.4
Hydrogen fluoride, HF (as dilute soln.) _____ 0.4
Water, to make 1 liter.

The processing solution as prepared by the above procedure had pH of 1.7. Panels of 2024 aluminum alloy were immersed in the solution for 6 minutes at temperature 82° F. Conversion coatings were formed on the surfaces that were of bright, strong, medium yellow color with iridescence. The coatings were free of blotches and had no tendency to smear or rub off. Corrosion resistance was excellent, as determined by salt spray exposure for period of 624 hours, about 96% of the coated surface area estimated as remaining intact.

The above processing bath was adjusted to pH 3.3 by addition of a small amount of ammonium hydroxide. Panels of 2024 aluminum alloy, immersed in the bath for 5 minutes at 82° F. now acquired a conversion coating that was essentially colorless, but bright, free from blotches, and with no tendency to smear or rub off. Salt spray resistance was excellent for colorless type coatings, as determined by salt spray exposure for 336 hours, about 90% of the coated surface area estimated as remaining intact.

*Example 7*

A processing solution was prepared by dissolving in water the following ingredients in the amounts indicated, in grams per liter of solution:

Ingredients: Grams
Cupric nitrate, $Cu(NO_3)_2 \cdot 3H_2O$ _____ 6.5
Chromium trioxide, $CrO_3$ _____ 1.4
Hydrogen fluoride, HF _____ 0.4

The solution prepared as noted above had pH of 1.8 without any adjustment. Panels of 2024 aluminum alloy were processed therein by immersion for 6 minutes at temperature 82° F. Strong, bright conversion coatings were produced on the aluminum surfaces, of light yellow color with moderate iridescence. There was no smearing or tendency to rub off. Corrosion resistance was excellent, as determined by salt spray exposure for 672 hours, about 90% of the coated surface area estimated as remaining intact.

*Example 8*

A processing solution was prepared by the following procedure, introducing the following ingredients in the amounts indicated, in grams per liter of solution:

Ingredients: Grams
Vanadium pentaoxide, $V_2O_5$ _____ 4.6
Nitric acid, sp. gr. 1.42 _____ 10.0
Water _____ 200.0

The above ingredients were mixed and allowed to stand for a period of 24 hours, with occasional warming to 150° F. and stirring. Then the following ingredients were added:

Grams
Chromium trioxide, $CrO_3$ _____ 1.4
Hydrogen fluoride, HF _____ 0.4
Water, to make 1 liter.

An essentially clear solution resulted from the above procedure, of pH 1.9. Panels of 2024 aluminum alloy were immersed therein, for 8 minutes at temperature of 82° F., and acquired conversion coatings that were bright, pale green in color, with yellowish tinge, and with moderate iridescence. The coatings were uniform and of pleasing appearance and did not smear or rub off. Corrosion resistance was good, although not as good as the yellow films of previous examples, as determined by salt spray test for period of 240 hours, about 90% of the coated surface area estimated as remaining intact.

Example 9

A processing solution was prepared by dissolving in water the following ingredients in the amounts indicated, in grams per liter of solution:

| Ingredients: | Grams |
|---|---|
| Chromic nitrate, $Cr(NO_3)_3 9H_2O$ | 13.1 |
| Chromium trioxide, $CrO_3$ | 1.4 |
| Hydrogen fluoride, HF | 0.4 |

The solution obtained by the above procedure was clear, of yellow color, and had pH 1.9 without any adjustment. Panels of 2024 aluminum alloy were processed therein, acquiring conversion coatings upon 6 minutes immersion that were of bright greenish-yellow color with slight purple blotch areas. There was no smearing or tendency to rub off. Cororsion resistance was good, as determined by salt spray exposure for 504 hours, about 90% of the coated surface area estimated as remaining intact.

The above solution was raised to pH 2.6 by adjustment with ammonium hydroxide addition. Panels of 2024 aluminum alloy were immersed for 5 minutes at 82° F. and acquired colorless conversion coatings of high lustre and generally good appearance. Corrosion resistance was excellent for the colorless type, as judged by salt spray test for period of 408 hours, about 90% of the coated surface area estimated as remaining intact.

Example 10

A solution was prepared by dissolving in water the following ingredients, in the amounts indicated, in grams per liter of solution:

| Ingredients: | Grams |
|---|---|
| Chromic nitrate, $Cr(NO_3)_3 9H_2O$ | 8.0 |
| Potassium fluotitanate, $K_2TiF_6$ | 4.0 |
| Potassium ferricyanide, $K_3Fe(CN)_6$ | 4.0 |

The above solution initially had a pH of 3.0, but after standing overnight the pH dropped to 2.7. 2024 aluminum alloy panels were then processed in the solution by immersion for 5 minutes at 80° F. The surfaces acquired conversion coatings of pale pastel green color with semi-lustre and moderate iridescence, quite uniform and of good appearance. There were no smearing or rub-off tendencies. Corrosion resistance was moderately good, as determined by salt spray exposure for period of 168 hours, about 90% of the coated surface area estimated as remaining intact.

Example 11

A processing solution was prepared by dissolving in water the following ingredients, in the amounts indicated, in grams per liter of solution:

| Ingredients: | Grams |
|---|---|
| Potassium fluotitanate, $K_2TiF_6$ | 4.0 |
| Potassium ferricyanide, $K_3Fe(CN)_6$ | 2.0 |
| Ferric acetate, basic, $Fe(OH)(C_2H_3O_2)_2$ | 0.8 |
| Nitric acid, Sp. Gr. 1.42 | 2.0 |

The above procedure resulted in a clear solution of pH 3.0. Panels of 3003 aluminum alloy were immersed therein for 15 minutes, at temperatures of 78 to 80 degrees F. The surfaces acquired conversion coatings of very pale yellowish-green color, bright, uniform, and generally of pleasing appearance. There was no smearing nor rub-off defect. Corrosion resistance was good, as determined by salt spray test of 504 hours, about 90% of the coated surface area estimated as remaining intact.

The conversion coating results obtained in Examples 1 to 11 are superior to conversion coatings employing the prior art conversion coating compositions not containing cations of the group 23 to 29 elements as regards particularly corrosion resistance, adherence and smear-proofness, brilliant coloring and color uniformity.

As to corrosion resistance, salt spray tests of the conversion coatings for periods greatly in excess of 168 hours employing the treating baths of these examples resulted in about 90% or more of the coated area of the panels remaining intact.

The instant invention accordingly provides compositions and procedure for readily forming colored or colorless conversion coatings on aluminum and its alloys, which are tough, tenacious, have excellent corrosion resistance, and are resistant to smearing.

The aluminum surfaces on which my invention can be applied include substantially pure aluminum and all of its ordinary commercial alloys of aluminum.

The various aluminum alloys provided with protective coatings in accordance with this invention are useful in the fabrication of airplanes, coach bodies, building structural parts, household utility appliances, and countless other industrial objects, all of which are thereby improved with respect to corrosion resistance, paint bonding and appearance.

The term "consisting essentially of" as used in the definition of the ingredients present in the compositions claimed is intended to exclude the presence of other materials in such amounts as to interfere substantially with the properties and characteristics possessed by the composition set forth but to permit the presence of other materials in such amounts as not substantially to affect said propertiies and characteristics adversely.

While I have described particular embodiments of my invention for the purpose of illustration, it should be understood that various modifications and adaptations thereof may be made within the spirit of the invention as set forth in the appended claims.

I claim:

1. A process for applying a coating to surfaces of objects of aluminum and its alloys, which comprises treating said objects in an aqueous acidic bath consisting essentially of a cation of the group consisting of vanadium, chromium, cobalt, nickel and copper, a halogen-containing anion forming at least some free halogen ion, and an anion including a member of the group consisting of hexavalent chromium and ferricyanide, the pH of said bath being in the range of about 1.6 to about 3.5.

2. A process as defined in claim 1, wherein said cation is nickel.

3. A process as defined in claim 1, wherein said cation is cobalt.

4. A process as defined in claim 1, wherein said cation is copper.

5. A process for applying a coating to surfaces of objects of aluminum and its alloys, which comprises treating said objects in an aqueous acidic bath consisting essentially of a cation of the group consisting of vanadium, chromium, cobalt, nickel and copper, a fluorine-containing anion forming at least some fluorine ion, and an anion containing hexavalent chromium, the pH of said bath being in the range of about 1.6 to about 3.5.

6. A process as defined in claim 5, wherein said pH is in the range of about 1.6 to about 2.2.

7. A process as defined in claim 5, wherein said pH is in the range of about 2.5 to about 3.5.

8. An aqueous acidic bath for applying a coating to surfaces of objects of aluminum and its alloys, which consists essentially of a cation of the group consisting of vanadium, chromium, nickel, cobalt and copper in an amount equivalent to about 0.2 to about 8.0 grams per liter, a halogen-containing anion forming at least some free halogen ion, and an anion including a member of the group consisting of hexavalent chromium and ferricyanide, the pH of said bath being in the range of about 1.6 to about 3.5.

9. An aqueous acidic bath as defined in claim 8, wherein the amount of said member employed is equivalent to about 0.3 to about 9.0 grams of said member per liter, and the weight ratio of said member to the halogen present in said halogen-containing anion is about 0.7:1 to about 2.5:1.

10. An aqueous acidic bath as defined in claim 8, wherein said cation is chromium.

11. An aqueous acidic bath as defined in claim 8, wherein said cation is copper.

12. An aqueous acid solution as defined in claim 8, wherein said anion is ferricyanide.

13. An aqueous acidic bath for applying a coating to surfaces of objects of aluminum and its alloys which consists essentially of a cation of the group consisting of vanadium, chromium, nickel, cobalt and copper, in an amount equivalent to about 0.2 to about 8.0 grams per liter, a fluorine-containing anion forming at least some fluorine ion, and a hexavalent chromium-containing anion in an amount equivalent to about 0.3 to about 9.0 grams per liter, the weight ratio of hexavalent chromium to fluorine in said fluorine-containing anion being about 0.7:1 to about 2.5:1, the pH of said bath being in the range of about 1.6 to about 3.5.

14. An aqueous acidic bath as defined in claim 13, wherein said cation is nickel.

15. An aqueous acidic bath as defined in claim 13, wherein said cation is cobalt.

16. An aqueous acid solution as defined in claim 12, wherein the amount of ferricyanide present is equivalent to about 0.3 to about 9.0 grams of ferricyanide per liter, and said halogen-containing anion is a fluorine-containing anion, the weight ratio of ferricyanide to fluorine in said fluorine-containing anion being about 0.7:1 to about 2.5:1.

17. A solid composition of matter for preparation of baths for coating objects of aluminum and its alloys, in the form of a mixture of compounds consisting essentially of, in chemically combined form, a cation-forming element of the group consisting of vanadium, trivalent chromium, cobalt, nickel and copper, an anion-forming substance including a member of the group consisting of hexavalent chromium and ferricyanide, and a halogen, said composition when added to water forming said cation, said anion and a halogen-containing anion forming at least some free halogen ion.

18. A solid composition of matter for preparation of baths for coating objects of aluminum and its alloys, in the form of a mixture of compounds consisting essentially of, in chemically combined form, a cation-forming element of the group consisting of vanadium, trivalent chromium, cobalt, nickel and copper, an anion-forming substance of the group consisting of hexavalent chromium and ferricyanide, and a halogen, said composition when added to water forming said cation, said anion and a halogen-containing anion forming at least some free halogen ion, said cation forming element being present in said solid composition in an amount equivalent to about 5.0 to about 45.0%, said anion forming substance being present in an amount equivalent to about 5.0 to about 50.0%, and said halogen being present in an amount equivalent to about 2.0 to about 40.0%, all proportions being based on the weight of the composition.

19. A solid composition of matter for preparation of baths for coating objects of aluminum and its alloys, in the form of a mixture of compounds consisting essentially of, in chemically combined form, a cation-forming element of the group consisting of vanadium, trivalent chromium, cobalt, nickel and copper; an effective amount of a hexavalent chromium-containing anion; and an effective amount of fluorine, said composition when added to water forming said cation, said anion and a fluorine-containing anion forming at least some free fluoride ion, said cation-forming element being present in said composition in an amount equivalent to about 5.0 to about 45.0% by weight of said composition.

20. A solid composition as defined in claim 19, wherein said hexavalent chromium is present in said composition in an amount equivalent to about 5.0 to about 50.0%, and said fluorine is present in an amount equivalent to about 2.0 to about 40.0%, all proportions being based on the weight of said composition.

21. A solid composition as defined in claim 20, wherein said cation-forming element is nickel.

22. A solid composition as defined in claim 20, wherein said cation-forming element is cobalt.

23. A solid composition of matter for preparation of baths for coating objects of aluminum and its alloys, in the form of a mixture of compounds consisting essentially of, in chemically combined form, a cation-forming element of the group consisting of vanadium, trivalent chromium, cobalt, nickel and copper; an effective amount of ferricyanide anion; and an effective amount of fluorine, said composition when added to water forming said cation, said anion, and fluorine-containing anion forming at least some free fluoride ion, said cation-forming element being present in said composition in an amount equivalent to about 5.0 to about 45.0% by weight of said composition.

References Cited in the file of this patent

UNITED STATES PATENTS

| | | |
|---|---|---|
| 2,308,194 | Miller | Jan. 12, 1943 |
| 2,322,208 | Loose et al. | June 22, 1943 |
| 2,577,887 | Gibson | Dec. 11, 1951 |
| 2,679,475 | Singler | May 25, 1954 |
| 2,796,370 | Ostrander et al. | June 18, 1957 |
| 2,851,385 | Spruance et al. | Sept. 9, 1958 |
| 2,868,679 | Pimbley | Jan. 13, 1959 |